US010691930B1

(12) United States Patent
Fadeev et al.

(10) Patent No.: US 10,691,930 B1
(45) Date of Patent: *Jun. 23, 2020

(54) IMAGE BASED USER IDENTIFICATION ACROSS MULTIPLE ONLINE SYSTEMS

(71) Applicant: Facebook, Inc., Menlo Park, CA (US)

(72) Inventors: Aleksey Sergeyevich Fadeev, Seattle, WA (US); Li Zhou, Mountain View, CA (US); Yimin Song, Mountain View, CA (US); Goran Predovic, Redmond, WA (US); Chaochao Cai, Bellevue, WA (US); Liang Xu, Bellevue, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/506,859

(22) Filed: Jul. 9, 2019

Related U.S. Application Data

(63) Continuation of application No. 16/201,852, filed on Nov. 27, 2018, now Pat. No. 10,387,715, which is a
(Continued)

(51) Int. Cl.
*H04N 7/00* (2011.01)
*H04N 7/18* (2006.01)
*G06K 9/00* (2006.01)
*G06F 16/9535* (2019.01)
*G06Q 50/00* (2012.01)
*H04L 12/58* (2006.01)
*G06F 40/20* (2020.01)
*H04L 29/08* (2006.01)

(52) U.S. Cl.
CPC ..... *G06K 9/00295* (2013.01); *G06F 16/9535* (2019.01); *G06F 40/20* (2020.01); *G06K 9/00275* (2013.01); *G06Q 50/01* (2013.01); *H04L 51/10* (2013.01); *H04L 51/32* (2013.01); *H04L 67/306* (2013.01)

(58) Field of Classification Search
USPC ........................................................ 382/116
See application file for complete search history.

(56) References Cited

U.S. PATENT DOCUMENTS 10,043,102 B1   8/2018   Goenka et al.
2009/0138805 A1*  5/2009  Hildreth ............ G06K 9/00335
                                              715/745
(Continued)

*Primary Examiner* — Stephen P Coleman
(74) *Attorney, Agent, or Firm* — Fenwick & West LLP

(57) ABSTRACT

An online system matches a user across multiple online systems based on image data for the user (e.g., profile photo) regardless whether the image data is from the online system, a different but related online system or a third party system. For example, to match the user across a social networking system and INSTAGRAM™ system, the online system compares the similarity between images of the user from both systems in addition to similarity of textual information in the user profiles on both systems. The similarity of image data and the similarity of textual information associated with the user are used by the online system as indicators of matched user accounts belonging to the same user across both systems. The online system applies models trained using deep learning techniques to match a user across multiple online systems based on the image data and textual information associated with the user.

20 Claims, 5 Drawing Sheets

Related U.S. Application Data continuation of application No. 15/497,454, filed on Apr. 26, 2017, now Pat. No. 10,242,251.

(56) References Cited

U.S. PATENT DOCUMENTS

| | | |
|---|---|---|
| 2011/0016161 A1* | 1/2011 | Loeb .................... G06F 16/335 707/805 |
| 2013/0169996 A1 | 7/2013 | McLeod et al. |
| 2014/0254934 A1 | 9/2014 | Laxminarayana Bhat et al. |
| 2014/0372436 A1* | 12/2014 | Makki .................... G06F 16/95 707/736 |
| 2015/0248710 A1* | 9/2015 | Medvedovsky .... G06F 16/5838 705/14.67 |

* cited by examiner

User Profile Table
300

| | Online System 100 | 2nd Online System 104 | 3rd Party System 105 |
|---|---|---|---|
| System ID 305 | Ruthine | Ruth | XYZ |
| Profile Image 310 | 310A | 310B | 310C |

FIG. 3A

ID Mapping Prediction Table
350

| ID Mapping | Image Score (0,1) | Text Score (0.1) | Prediction Score (%) |
|---|---|---|---|
| Ruthine <> Ruth | 0.8 | 0.85 | 90% |
| Ruthine <> XYZ | 0.45 | 0.2 | 30% |

FIG. 3B

IMAGE BASED USER IDENTIFICATION ACROSS MULTIPLE ONLINE SYSTEMS

CROSS REFERENCE TO RELATED APPLICATIONS

This application is a continuation of co-pending U.S. application Ser. No. 16/201,852, filed Nov. 27, 2018, which is a continuation of U.S. application Ser. No. 15/497,454, filed Apr. 26, 2017, now U.S. Pat. No. 10,242,251, each of which is incorporated by reference in its entirety

BACKGROUND

This disclosure generally relates to online systems, and more specifically to identifying a user across multiple online systems based on image data (e.g., profile photos) associated with the user.

With the increasing number of available online systems, such as social networking systems, users may be individually registered across a wide number of online systems. Each time the user registers with an online system, the user has a new user profile that may be unique to that particular online system. Users may use each online system for different purposes. For example, a user may primarily utilize a first online system as a social online network, utilize a second online system for visual storytelling, and primarily utilize a third online system as a professional online network. Thus, users may choose to provide different information (e.g., different profile photos) in their user profile on each respective online system.

Online systems often utilize the information provided by a user in the user profile for a variety of purposes. For example, online systems may desire to deliver content items that are tailored for a user based on the user's interests and/or characteristics that are listed in the user's profile. However, given that a user may only choose to provide a portion of his/her characteristics or interests to any one online system, each online system may not have a full understanding of the user. Furthermore, a user may choose to use a different profile photo for each respective online system. This leads to inefficiencies, e.g., failure to identify a same user across multiple online systems, especially in the context of content delivery where the lack of a comprehensive profile of the user may lead to the delivery of content that is poorly tailored to the user.

SUMMARY

An online system matches a user across multiple online systems based on image data for the user (e.g., profile photo) regardless whether the image data is from the online system, a different but related online system or a third party system. In one embodiment, the online system matches a user across a social networking system (e.g., FACEBOOK™), and another online system, which is different but related to the social networking system (e.g., INSTAGRAM™). To match the user across the social networking system and INSTAGRAM, the online system compares the similarity between images of the user from both systems in additional to similarity of textual information describing the user (e.g., demographic information in the user profiles) on both systems. The similarity of image data and the similarity of textual information associated with the user are used by the online system as indicators of matched user accounts belonging to the same user across both systems.

In another embodiment, the online system receives images of a user from a third party system, e.g., a partner of the online system. Additionally, the online system may receive textual data describing the user, e.g., browsing and shopping activities of the user on a website hosted by the third party system. The online system compares the image data and textual data of the user from the third party system with corresponding image data (e.g., profile photo of the user) and textual data of the user (e.g., descriptive user profile information) associated with the online system. Based on the comparison, e.g., degree of similarity between the image/textual data of the user, the online system determines whether the user accounts from both systems belong to the same user.

In both embodiments, the online system applies one or more models trained using deep learning techniques to match a user across multiple online systems, e.g., a trained image model for analyzing image data, a trained text model for analyzing text data, and a trained mapping prediction model for predicting identity match based on image data and textual data. Each trained image and text model generates a prediction of a desired feature characteristic of data describing the user, e.g., a similarity score between image data from different online systems, and a similarity score between textual data from different online systems. Based on the similarity scores of a user, the trained mapping prediction model generates a prediction of whether multiple user accounts of a user across multiple online systems belong to the same user. The online system uses the prediction to build more information about the user in the online system, e.g., by sharing user profile data from multiple online systems among each other and generating a comprehensive profile of the user. The additional user information/comprehensive user profile is useful for improved and targeted content delivery to a user that may have disparate information scattered throughout different online systems.

BRIEF DESCRIPTION OF THE DRAWINGS

FIG. 3A is an example user profile table showing a list of identifiers and profile photos of a user associated with multiple online systems, in accordance with one embodiment.

FIG. 3B is an example identity mapping prediction table associated with the user shown in FIG. 3A, in accordance with an embodiment.

DETAILED DESCRIPTION

Figure 1:
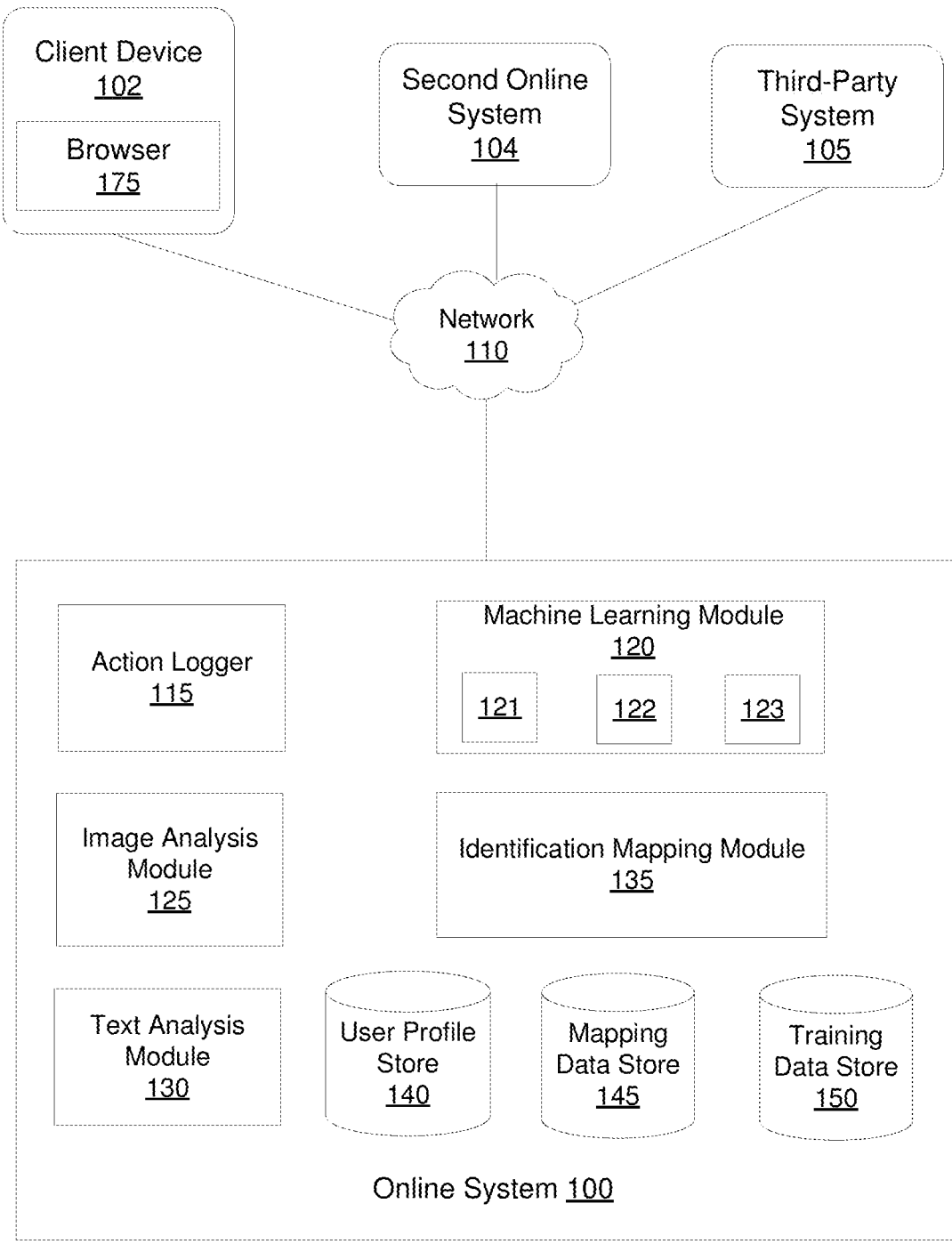
FIG. 1 is a system environment for identifying a user across multiple online systems, in accordance with an embodiment.

FIG. 1 is a system environment for identifying a user across multiple online systems. In the embodiment shown in FIG. 1, the system environment includes a client device 102 operated by a user of a first online system 100 (also referred to as "online system 100"), a second online system 104, a third party system 105, and the online system 100. The client device 102, the second online system 104, the third party system 105, and the online system 100 communicate with one another through a network 110. While FIG. 1 shows one client device 102 for simplicity, each with a browser 175, one online system 100, one second online system 104, and one third party system 105, it should be appreciated that any number of these entities may be included in the system environment. In alternative configurations, different and/or additional entities may also be included in the system environment. In one embodiment, the online system 100 is a social networking system, the second online system is a visual storytelling system such as an INSTAGRAM' system, and the third party system 105 is a partner system of the online system 100. One or more of the third party systems 105 can also be social networking systems.

A client device 102 is a computing device capable of receiving user input through a browser 175, as well as transmitting and/or receiving data via the network 110. Examples of client devices 102 include desktop computers, laptop computers, tablet computers (pads), mobile phones, personal digital assistants (PDAs), gaming devices, or any other electronic device including computing functionality and data communication capabilities. A user of the client device 102 can login to the online system 100 and interact with web pages provided by the online system 100 or the third party system 105. As one example, a user may access a web page of a third party system 105 through the browser 175 of a client device 102 and make a purchase for a product. Similarly, a user of the client device 102 can login to the second online system 104 to share content with other users connected to him/her in the second online system 104 and in the first online system 100. Additionally, the client device 102 may have a device identifier that uniquely identifies the client device 102.

The network 110 facilitates communications among one or more client devices 102, the online system 100, the second online system 104, and the third party system 105. The network 110 may be any wired or wireless local area network (LAN) and/or wide area network (WAN), such as an intranet, an extranet, or the Internet. In various embodiments, the network 110 uses standard communication technologies and/or protocols. Examples of technologies used by the network 110 include Ethernet, 802.11, 3G, 4G, 802.16, or any other suitable communication technology. The network 110 may use wireless, wired, or a combination of wireless and wired communication technologies. Examples of protocols used by the network 110 include transmission control protocol/Internet protocol (TCP/IP), hypertext transport protocol (HTTP), simple mail transfer protocol (SMTP), file transfer protocol (TCP), or any other suitable communication protocol.

The second online system 104 represents another online system that can be separate from the online system 100 in that the two online systems do not otherwise share user identifiers. For example, the first online system 100 and the second online system 104 are in separate domains but have certain management connections of their operations. In one embodiment, the second online system 104 is an INSTAGRAM™ system, which allows users to share pictures and videos either publically or privately within the system, as well as through other online systems such as the first online system 100. A user can login using a specific ID belonging to the user on the second online system 104 (e.g. second online system user ID). Users of the second online system 104 can upload photos and videos to the second online system 104, follow other users' news feeds, and tag uploaded images with geolocation information (e.g., longitude and latitude coordinates, and/or the name of a location).

The second online system 104 may maintain user profiles in a user profile store, each user profile identified by a user identity (ID) and associated with a user of the second online system 104. A user profile of a user of the second online system 104 may include declarative information about the user that was explicitly shared by the user and may also include profile information inferred by the second online system 104. In one embodiment, a user profile includes multiple data fields, each describing one or more attributes of the corresponding user of the second online system 104. Examples of information stored in a user profile include biographic, demographic, and other types of descriptive information, such as work experience, educational history, gender, hobbies or preferences, location and the like. A user profile may also store other information provided by the user, for example, profile images. In certain embodiments, a profile image of a user may be tagged with identification information of the user of the second online system 104 displayed in an image. The user profile store associated with the second online system 104 further stores data describing one or more relationships between different users and allows users to specify their relationships with other users within the second line system 104.

The third party system 105 represents any external system outside of the online system 100. For example, the third party system 105 may be a third party retailer that sells products of interest to users of the online system 100. In some embodiments, the two systems are completely independent and without any ownership or management connection. The third party system 105 is responsible for providing data to a user. For example, the third party system 105 provides web page interfaces (e.g. online shopping cart page) for a user to make an online purchase for a product. The user can login using a specific ID belonging to the user on the partner system (e.g. partner system user ID). Additionally, the user may provide personally identifiable information (PII), such as PII that might be provided in a purchase process or during registration as a user of the online system 100. Both the specific ID identifying the user on the partner system as well as the PII information provided by the user may be stored by the third party system 105 in a database of the third party system 105, as a cookie on the user's browser 175, among other locations.

The online system 100 can receive the user identification information in various ways and from various online systems separate/external to the online system 100, e.g. the second online system 104 and the third party system 105. These separate/external systems can directly send the text data, e.g., the textual description of user profiles, and image data, e.g., profile photos of user profiles, to the online system 100, or the online system 100 may receive them via other sources, such as via cookies, via tracking pixels on web pages associated with the third party system 105, or from mobile applications associated with the second online system 104.

In some embodiments, the online system 100 receives identification information of a user and information about the behavior of the user on various web pages of the third party system 105 or a second online system 104 using a tracking pixel that the third party system 105 or the second online system 104 places on the web pages. For example, a user searches for flights to Vienna, Austria on a web page domain hosted by the third party system 105. In one embodiment, the tracking pixel is a segment of HTML code that the online system 100 provides to the third party system 105 to be added to its web pages. For example, a tracking pixel is a transparent 1×1 image, an iframe, or other suitable object. When a user's browser 175 requests the content of a page having the tracking pixel, the HTML code makes a server call to the online system 100, which returns a 1×1 transparent image (e.g., a GIF), and the server call also sends certain information about the user or the actions the user is taking to the online system 100. For example, it may send information about the actions the user was taking on the web page (e.g., putting a product in a shopping cart, completing a checkout process, browsing a product page, etc.), price of product a user looked at or purchased, a SKU number for the product, a color, style, type or size of the product, a timestamp, a user identifier for the user that is used by the third party system 105, among other data. In addition, when the server call is made to the online system 100, the online system 100 can request a cookie that was previously placed on the browser by the online system 100, from which the online system 100 can acquire information about the client device 102 and the browser 175, such as the Internet Protocol (IP) address of the client device 102, an online system user ID for the user, etc. If the browser 175 used to visit the website does not include a cookie previously set by the online system 100, a cookie is then set on the browser 175. If the browser 175 includes a cookie already, the online system 100 can access the cookie.

In one embodiment, the third party system 105 and the second online system 104 can allow the online system 100 access to a system cookie that stores information that the second online system 104 or the third party system 105 has about a user, browser, device, etc. (this may require user permission for this type of sharing). For example, if the second online system 104 is closely affiliated or owned by the online system 100 (e.g., INSTAGRAM™ and FACEBOOK™), the two parties may work together such that the server call to the online system domain results in a redirect of the user's browser to the second online system domain, and under the second online system domain, the second online system cookie can be requested from the browser 175 before the browser is directed back to the online system 100 resulting in the online system 100 having access to the second online system cookie. The second online system cookie may include the second online system's user identifier for the user, a browser ID, a client device ID, and other information the partner system tracks for the user, e.g., a user profile, and a profile photo. Thus, the online system 100 gains access to identifiers and behavioral information that are associated with the user from interactions between the user and the second online system 104.

In one embodiment, a user logs into an account on the online system 100 to access a personalized set of web pages, such as a user profile page and a newsfeed page, using a browser 175. When a user logs in to its account with the online system 100, the online system 100 writes one or more cookies to the client device 102, such as to the browser 175, identifying the user and the browser. For example, a cookie including a user identifier associated with the user by online system 100 is stored and a cookie including a browser identifier is stored by the client device 102; the cookie including the browser identifier may include data identifying a browser type. While the user is logged in to the online system 100 using the browser 175, the cookie including the user identifier is stored by the browser 175. The cookie including the browser identifier is stored until it is deleted by the user or deleted by the browser 175. In one embodiment, users may opt out of receiving cookies from the online 100 to prevent the online system 110 from storing cookies using the browser 175.

Figure 2:
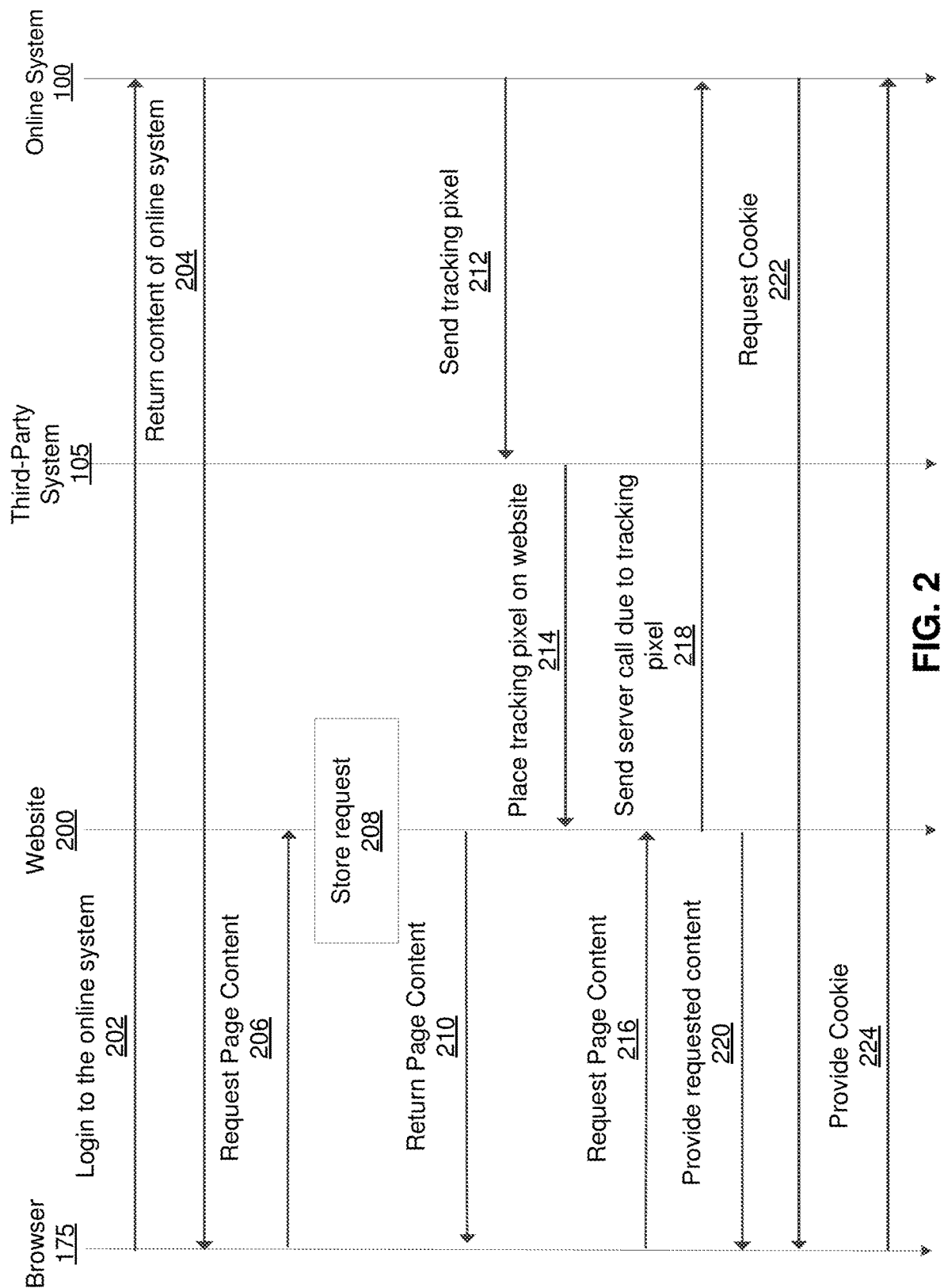
FIG. 2 is an interaction diagram depicting an example for providing identifiers associated with a user to the online system, in accordance with an embodiment.

Turning now to FIG. 2, FIG. 2 depicts an interaction diagram between a browser 175 on a client device 102, a website 200 of the third party system 105, and the online system 100. FIG. 2 illustrates one embodiment of how the online system 100 may receive identifiers (e.g. browser ID, device ID, partner ID) based on the actions of the user external to the online system 100. One skilled in the art can appreciate a variety of different scenarios in which the online system 100 receives one or more identifiers associated with a user of the online system 100, e.g., based on the actions of the user within the second online system 104. One skilled in the art can also appreciate a variety of different scenarios in which the online system 100 receives user profile information associated with a user of the online system 100, e.g., profile photos of the user from the second online system 105 and from the third party system 105.

In various embodiments, a user of the online system 100 may use a browser 175 on a client device 102 to access content on the online system 100. For example, the user logs in 202 to the online system using the browser 175 by providing the appropriate user ID and password. The online system 100 receives the login information and returns 204 the content of the online system 100. In response to such an access to the online system 100, the online system 100 may store a cookie including the user ID (e.g. online system user ID) that was provided by the user to login to the online system 100. The cookie is stored on the browser 175.

In one embodiment, at a subsequent time after logging into the online system 100, the user may use the browser 175 on the client device 102 to access a website 200 of the third party system 105. For example, the user may decide to partake in online shopping on the website 200 associated with the third party system 105 and provides instructions for the browser to request 206 page content for a particular product of interest. The user provides a login to the third party system 105 using a partner system user ID that the user has previously set up with the third party system 105. The website 200 stores 208 the request including the partner system user ID. In various embodiments, the partner system user ID is stored as a cookie on the browser 175 used by the user of the client device 102. The website 200 returns 210 the page content requested by the user. Steps 206, 208, and 210 may occur repeatedly as the user continues to browse different online websites 200.

In various embodiments, the online system 100 sends 212 a tracking pixel to the third party system 105 to better understand the behavior of users that are browsing web pages of the partner user 105. The partner system places 214 the tracking pixel on a website 200. The user of the client device 102 requests 216 page content from the website 200 using the browser 175. The website 200 can provide 220 the requested content to the browser 175 similar to step 210.

Additionally in this scenario, the website 200 includes the tracking pixel from the online system 100. Therefore, when the browser 175 requests 216 content from the website 200, a server call to the online system 100 is sent 218 due to the presence of the tracking pixel. In various embodiments, the website also sends, along with the server call, the browsing information of the user on the website 200 of the third party system 105. The online system 100 requests 222 a cookie from the browser 175 of the client device 102 when the server call is sent. The online system 100 is able to access the cookie provided 224 by the browser 175 and gain access to the identifiers that are stored in the cookie (e.g. online system user ID, partner system user ID, and other identifiers).

Turning back to FIG. 1, the online system 100 receives image data of a user, e.g., profile images of the user, and textual information describing the user, from the second online system 104 and/or the third party system 105, and predicts whether multiple user accounts associated with the user belong to the same user across the online system 100, the second online system 104, and/or the third party system 105 based on the received data of the user. The predictions for each user of the online system 100 are used to build more information about the user in the online system 100, e.g., building a comprehensive user profile for the user, and to provide more relevant content to the user on the online system 100.

In various embodiments, the online system 100 includes a user profile store 140, a mapping data store 145, a training data store 150, an action logger 115, a machine learning module 120, an image analysis module 125, a text analysis module 130, and an identity mapping module 135. Similar to the second online system 104, the online system 100 maintains user profiles associated with users of the online system 100 in the user profile store 140, each user profile identified by a user ID and associated with a user of the online system 100. For each user of the online system 100, the user profile can be bundled together into a comprehensive user profile with other user profiles that are associated with the same user across multiple online systems, e.g., the second online system 104 and the third party system 105. The other profiles can be received by the online system 100 from the client device 102, the second online system 104 or the third party system 105 (e.g., through the network 110).

The action logger 115 identifies interactions of users internal and external to the online system 100. User interactions internal to the online system 100 include interactions between users, interactions between a user and a page within the online system 100, interactions between a user and a post on a page. These interactions may be stored as an association (e.g. an edge in a social graph) between the user (e.g. a first node in the social graph) and the entity that the user interacted with (e.g. a second node in the social graph). User interactions with a page outside the online system 100 include sharing photos and videos on a visual storytelling service hosted by the second online system 104, purchasing or reviewing a product or service using an online marketplace hosted by a third party system 105, registering with or subscribing to a website hosted by a third party system 105, requesting information from a third party system 105, and other similar actions. These interactions may be previously stored as a cookie on a browser 175 accessed by the user and subsequently provided to the online system 100. When an action is taken on and/or off the online system 100, an entry for the action is generated by the action logger 115 and associated with the user's user profile. Furthermore, a timestamp of each interaction is also logged by the action logger 115.

The machine learning module 120 trains one or more models, e.g., an image analysis model 121, a text analysis model 122 and a mapping prediction model 123, using features based on training data from the training data 150. The machine learning module 120 can store the trained models 121, 122 and 123 in the online system 100 and periodically re-train the models using features based on updated training data. Example features include image features and textual features associated with users of the online system 100. In some embodiments, the training data store 150 includes predetermined information about a population of users of the online system 100 provided to the online system 100 or from another module of the online system 100, e.g., the action logger 115 or user profile store 140.

In one embodiment, the machine learning module 120 retrieves training data from the training data store 150 and extracts image features from the training data. The machine learning module 120 trains the image analysis model 121 using the extracted image features. The training data includes information about users of the online system 100, information about users of the second online system 104, and information about users of the third party system 105. Examples of information about users of the online system 100 include profile photos of users of the online system 100, photos posted by the users of the online system 100, and photos posted by other users who are socially connected with a user within the online system 100 that are viewed, commented on or shared by the user. Examples of information about users of the second online system 104 include profile photos of users of the second online system 104. Examples of information about users of the third party system 105 include profile photos of users of the third party system 105. A user may choose to use a same or different profile image on each respective online system.

In one embodiment, the machine learning module 120 trains the image analysis model 121 to recognize subject matter in content based on visual attributes of the content. Content may include, for example, profile images and descriptive information of users of various online systems. A visual attribute may include a visual pattern in an image or an image segment reflecting a characteristic property of subject matter depicted in content. Visual attributes may be based on one or a combination of, for example, appearance, color, shape, layout, and the like. For example, the extracted image features from the training data are visual features of human faces commonly used in user profile photos. The machine learning module 120 trains the image analysis model 121 to recognize human faces in image data using facial recognition algorithm to identify human faces.

In some embodiment, the machine learning module 120 also trains the image analysis model 121 to differentiate two images by comparing the two images in a selected representation space. In one embodiment, the machine learning module 120 trains the image analysis model 12 to compare images represented in corresponding color histograms and to measure dissimilarity between the histograms of two images in a variety of distance measure, e.g., $\chi 2$ statistics. In another embodiment, the machine learning module 120 trains the image analysis model 12 to compare images represented in a continuous probabilistic framework based on a mixture of Gaussians models and to measure dissimilarity between two images in terms of KL-divergence.

The image analysis module 125 uses the trained image analysis model 121 to recognize one or more visual patterns in images and to differentiate two images during deployment. In one embodiment, the image analysis module 125 receives two profile images of a user from different online systems and determines whether the profile images depict a same user based on a dissimilarity measure between the two profile images. The image analysis module 125 generates an image score to represent a degree of dissimilarity between the two profile images. If the generated image score is below a predetermined threshold value, e.g., 0.5 out of a total of 1.0, the image analysis module 125 determines that the two profile images are dissimilar, thus, belonging to two different users.

In one embodiment, the machine learning module 120 retrieves training data from the training data store 150 and extracts textual features from the training data. The machine learning module 120 trains the text analysis model 122 using the extracted textual features. Examples of textual features include descriptive text about users of the online system 100, descriptive text about users of the second online system 104, and descriptive text about users of the third party system 105. Descriptive text about a user of an online system may include biographic, demographic, and other types of descriptive information, such as work experience, educational history, gender, hobbies or preferences, location and the like. In one embodiment, the descriptive text about a population of users of the online system 100, the second online system 104 and the third party system 105 are from corresponding user profiles and are provided to the online system 100.

In one embodiment, the machine learning module 120 trains the text analysis model 122 to recognize textual cues of subject matter in content. A textual cue may include a nonvisual indicator of the subject matter in content, e.g., tagged description of a user in his/her user profile. Examples of textual cues include a descriptive tag, global positioning system (GPS) coordinates of a profile image, the identity of a tagger of the content, and the identity of an uploader of content. The machine learning module 120 trains the text analysis model 122 to recognize textual cues of subject matter in content using a variety of deep learning techniques, e.g., natural language processing techniques on body of texts or subtexts of user online profiles to determine keywords, phrases, or hashtags, and the like, that frequently appear in user online profiles.

In some embodiment, the machine learning module 120 also trains the text analysis model 122 to differentiate two texts by comparing the two texts. In one embodiment, the machine learning module 120 trains the image analysis model 12 to compare texts based on keywords associated with the texts and to measure similarity between two texts. Example measures of similarity include cosine similarity or the generalized Euclidean distance between the vectors associated with the keywords of two texts.

The text analysis module 130 uses the trained text analysis model 122 to recognize textual cues in a textual description of a user and to differentiate two textual descriptions during deployment. In one embodiment, the text analysis module 130 receives two profile descriptions of a user and determines whether the two profiles describe a same user based on a similarity measure between the descriptions of two profiles. The text analysis module 130 generates a text score to represent a degree of similarity between the two profile descriptions. If the generated text score is below a predetermined threshold value, e.g., 0.6 out of a total of 1.0, the text analysis module 125 determines that the two profiles are dissimilar, thus, belonging to two different users.

The machine learning module 120 may also train a mapping prediction model 123 to predict whether multiple user accounts belong to a same user across multiple online systems. In one embodiment, the machine learning module 120 trains the mapping prediction model 123 for such predictions based on the image features and textual features extracted from the training data. For example, the machine learning module 120 trains the mapping prediction model 123 to predict whether a user account associated with a user of the online system 100 and a user account associated with a user of the second online system 104 belong to a same user of the online system 100 based on the image features and textual features associated with these two accounts. For another example, the machine learning module 120 trains the mapping prediction model 123 to predict whether a user account associated with a user of the online system 100 and a user account associated with a user of the third party system 105 belong to a same user of the online system 100 based on the image features and textual features associated with these two accounts.

In one embodiment, the machine learning module 120 trains the mapping prediction model 123 to assign weights among different image features, among different textual features, and/or between image features and textual features using various machine learning schemes. The weight of a feature indicates the relevant importance of the feature with respect to other corresponding features in a set. For example, among image features associated with a user, the weight of a facial visual feature is higher than the weight for a non-facial visual feature. For another example, for an image depicting a person holding a mobile phone, the weight for the face of the person has a higher weight than the one for the mobile phone. For yet another example, among textual features associated with a user, the weight of a text describing the identity of the user has a higher weight than a text describing another user socially connected with the user.

In one embodiment, the mapping prediction model 123 is trained to assign higher weight to image features than to corresponding textual features. For example, the mapping prediction model 123 is trained to assign a higher weight to a profile photo of a user than a weight to the GPS coordinates of the profile photo. The mapping prediction model 123 is also trained to assign different weights to features with respect to different applications of the trained mapping prediction model 123. For example, if the mapping prediction model 123 is to predict user personal interests at deployment, the mapping prediction model 123 can be trained to assign higher weights to features associated with the second online system 104 than features associated with other online systems. As one example, the second online system 104 may be INSTAGRAM™, where the user may provide interests or information that would reveal characteristics of the user, and the mapping prediction model 123 can be trained to assign higher weights to features associated with the second line system 104 than corresponding features associated with other online systems, e.g., the third party system 105.

The identification mapping module 135 uses the trained mapping prediction model 123 to predict whether multiple user accounts associated with a user belong to the same user across the online system 100, the second online system 104, and/or the third party system 105 based on image data, textual data, and/or combination of both for the user. In one embodiment, the identification mapping module 135 generates a prediction score for each ID mapping between two user accounts; the predication score for an ID mapping represents a likelihood of whether the two user accounts belong to a same user.

The mapping data store 145 stores ID mapping data such as a user ID associated a user of an online system, a profile photo associated with an online system, a timestamp of the profile photo, status of the user profile within an online system, GPS coordinates of the profile photo, tag indicating the location of the profile photo, and the like. Turning to FIG. 3A, FIG. 3A is an example user profile table 300 showing a list of IDs and profile photos of a user associated with multiple online systems, in accordance with one embodiment. In the example user profile table 300, there are three online systems: the online system 100 (e.g., FACEBOOK™), the second online system 104 (e.g., INSTAGRAM™), and the third party system 105 (e.g., a partner system of the online system 100). A user associated with an online system is identified by a system ID 305, e.g., "Ruthine" within the online system 100, "Ruth" within the second online system 104, and "XYZ" within the third party system 105. A user associated with an online system may also have a profile image 310 of the user, e.g., 310A with the online system 100, 310B with the second online system 104, and 310C with the third party system 105.

The image analysis module 125 applies a trained image analysis model, e.g., the model 121 trained by the machine learning module 120, to the profile images 310A, 310B and 310C to recognize visual features of human faces and to determine similarity among the profile images. For example, the image analysis module 125 uses the trained image analysis model to compare the profile images 310A and 310B, and compare the profile images 310A and 310C. Based on the similarity comparison, the image analysis module 125 computes an image score, e.g., 0.8 for 310A and 310B comparison, indicating a likelihood that the profile images 310A and 310B depicting a same user. Similarly, the image analysis module 125 computes an image score, e.g., 0.45 for 310A and 310C comparison, indicating a likelihood that the profile images 310A and 310C depicting a different user.

The text analysis module 130 applies a trained text analysis model, e.g., the model 122 trained by the machine learning module 120, to the textual information associated with each user, e.g., descriptive text describing a user including the system ID 305, to determine similarity among the textual information of the user. For example, the text analysis module 130 uses the trained text analysis model to compare the system IDs, "Ruthine" and "Ruth," and compare the system IDs, "Ruthine" and "XYZ." Based on the similarity comparison (e.g., keywords matching), the text analysis module 125 computes a text score, e.g., 0.85, indicating a likelihood that the system IDs, "Ruthine" and "Ruth," belong to a same user. Similarly, the text analysis module 130 computes a text score, e.g., 0.2, indicating a likelihood that the system IDs, "Ruthine" and "XYZ," belong to different users.

The identification mapping module 135 uses the trained mapping prediction model 123 to predict whether multiple user accounts associated with a user belong to the same user across the online system 100, the second online system 104, and/or the third party system 105 based on image data, textual data, and/or combination of both for the user. Using the same example shown in FIG. 3A, for each ID mapping, the identification mapping module 135 assigns weights to the image score and text score and computes a prediction score based on the weighted image score and text score. In one example, the prediction score is an average score of the sum of the weighted image score and the weighted text score, where the average score is converted to a percentage representation. FIG. 3B is an example ID mapping prediction table 350 associated with users shown in FIG. 3A, in accordance with an embodiment. The prediction score 90% for Ruthine<>Ruth mapping indicates that the user accounts associated with "Ruthine" within the online system 100 and "Ruth" within the second online system 104 are very likely belong to the same user, i.e., "Ruthine" of the online system 100. The prediction score 30% for Ruthine<>XYZ mapping indicates that the user accounts associated with "Ruthine" within the online system 100 and "XYZ" within the third party system 105 are less likely belong to the same user, i.e., "Ruthine" of the online system 100.

The identification mapping module 135 uses the predictions for each user of the online system 100 to build more information about the user in the online system 100, e.g., building a comprehensive user profile for the user, and to provide more relevant content to the user on the online system 100. In one embodiment, the identification mapping module 135 shares the comprehensive user profile across multiple online systems, e.g., sharing user Ruthine profile within the online system 100 with the second online system 104 for the corresponding Ruth profile. Based on the comprehensive user profile for Ruthine of the online system 100, the online system 100 provides more relevant content to Ruthine within the online system 100. For example, if the user profile of Ruth within the second online system 104 indicates that Ruth is very interested in rescuing shelter dogs, which is not previously known to the online system 100, the online system 100 can select articles and events on shelter dogs to Ruthine within the online system 100.

Figure 4:
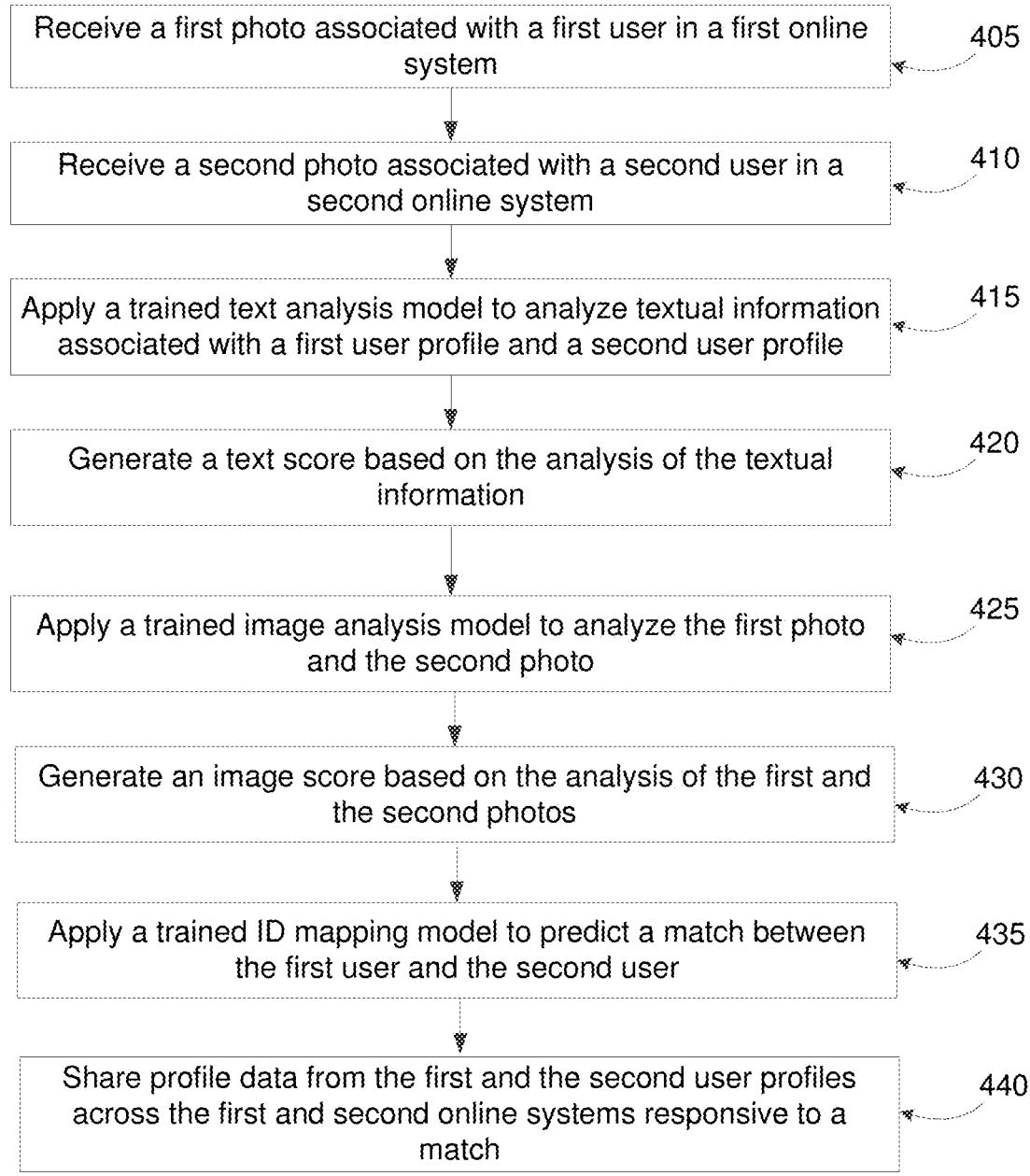
FIG. 4 illustrates a flowchart of identifying a user across two online systems, in accordance with an embodiment.

FIG. 4 illustrates a flowchart of identifying a user across two online systems, in accordance with an embodiment. Initially, the online system 100 receives 405 a first photo associated with a first user in a first online system, e.g., a profile photo of a user of the online system 100. The online system 100 receives 410 a second photo associated with the second user in a second online system, e.g., a profile photo of a user of the second online system 104. The online system 100 applies 415 a trained text analysis model to descriptive text describing the first user and the second user, e.g., demographic description of the first user and the second user. Based on the analysis of the textual information associated with the first user profile and the second user profile, the online system 100 generates 420 a text score indicating a likelihood that the first user and second user are the same user across the first online system and the second online system.

The online system 100 applies 425 a trained image analysis model to the first photo of the first user and the second photo of the second user. Based on the analysis of the image features associated with the first photo and the second photo, the online system 100 generates 320 an image score indicating a likelihood that the first user and second user are the same user across the first online system and the second online system.

The online system 100 applies 435 a trained ID mapping model to predict a match between the first user and the second user based on the generated image score and the text score associated with the first user and the second user. For example, the online system 100 generates a prediction score based on the image score and the text score, where the prediction score exceeding a predetermined threshold indicates that the first user and the second user are the same user. Responsive to a match, the online system 100 shares 440 profile data, e.g., a comprehensive profile of the first user based on information supplemented by a corresponding user profile associated with the second online system, across the first and second online systems.

Figure 5:
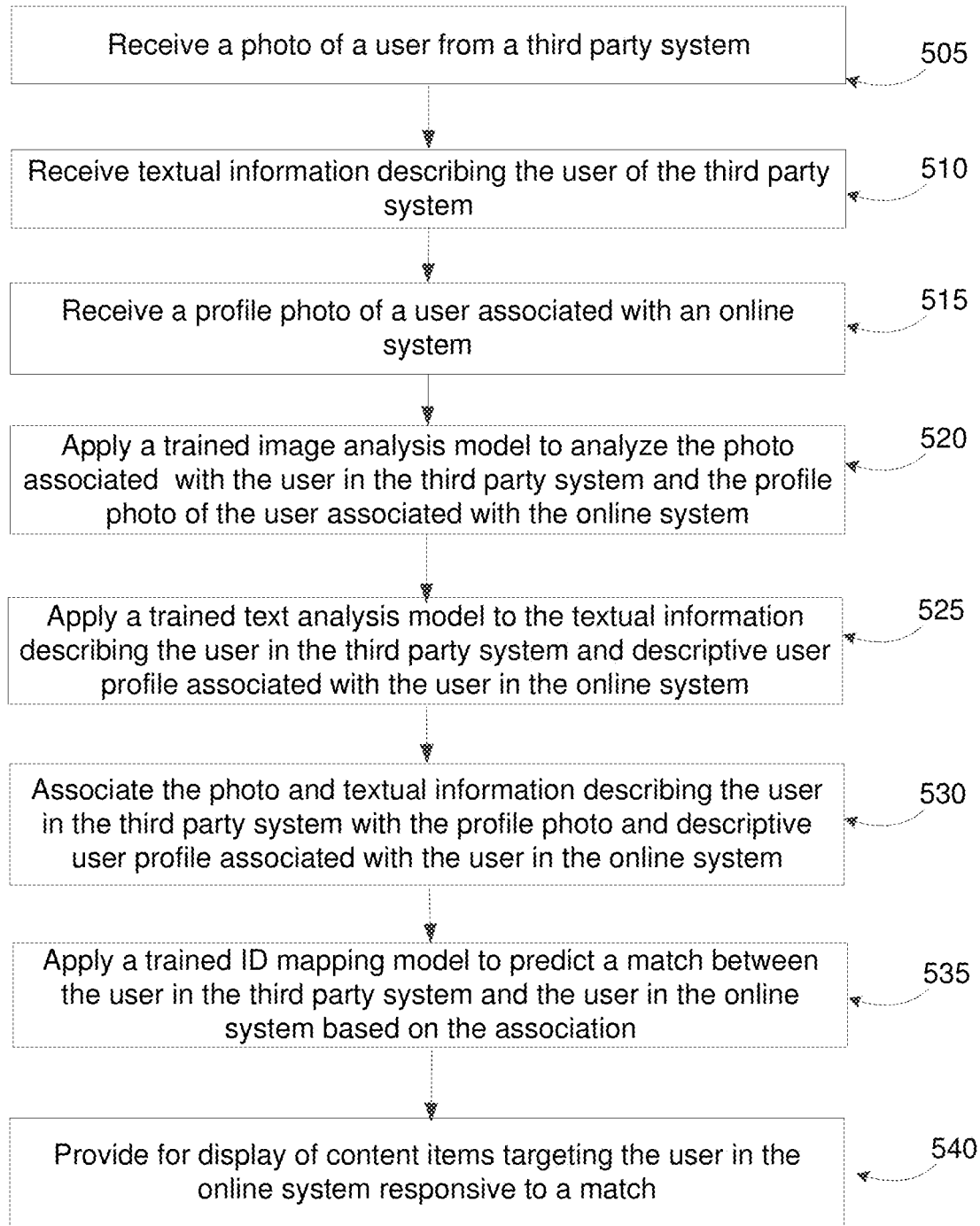
FIG. 5 illustrates a flowchart of identifying a user across an online system and a third party system, in accordance with an embodiment The figures depict various embodiments for purposes of illustration only. One skilled in the art will readily recognize from the following discussion that alternative embodiments of the structures and methods illustrated herein may be employed without departing from the principles of the invention described herein.

FIG. 5 illustrates a flowchart of identifying a user across the online system 100 and a third party system 105, in accordance with an embodiment. Initially, the online system 100 receives 505 a photo of a user from a third party system 105, e.g., a photo of the user provided by a partner system of the online system 100. The online system 100 receives 510 textual information describing the user of the third party system 105. The online system 100 also receives 515 a profile photo of a user associated with the online system 100. The online system 100 applies 520 a trained image analysis model to the photo of the user of the third party system 105 and the profile photo of the user of the online system 100. The online system 100 applies 525 a trained text analysis model to the textual information describing the user of the third party system 105 and the descriptive user profile associated with the user of the online system 100, e.g., demographic description of the user of the online system 100. Based on the analysis of the image features associated with the photos and analysis of the textual information associated with the two users, the online system 100 associates 530 the photo and textual information describing the user of the third party system 105 with the profile photo and descriptive user profile associated with the user of the online system 100.

The online system 100 applies 535 a trained ID mapping model to predict a match between the user of the third party system 105 and the user of the online system 100 based on the association. For example, the online system 100 generates a prediction score based on the image features analysis and the textual information analysis, where the prediction score exceeding a predetermined threshold indicates that the user of the third party system 105 is highly likely the user of the online system 100. Responsive to a match, the online system 100 provides 540 for display of content items targeting the user of the online system 100. For example, the online system 100 selects the content items for the user of the online system 100 based on information supplemented by a corresponding user profile associated the user of the third party system 105.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, by a first online system having a first user associated with a first photo, a second photo associated with a second user of a second online system;
   generating, by the first online system, a prediction score indicating a degree of a match between the first user and the second user by applying a trained prediction model to an aggregate set of facial features of the first and the second photos and to an aggregate set of text features describing the first user and the second user; and
   responsive to the degree of the match satisfying a threshold condition, sharing, by the first online system, user information extracted from textual information describing the first user and the second user, across the first online system and the second online system.

2. The method of claim 1, wherein the prediction score is generated based on at least one of a facial feature analysis of facial features of the first photo and the second photo and a text feature analysis of text features describing the first user and the second user.

3. The method of claim 1, wherein sharing user information across the first online system and the second online system comprises supplementing user profile data associated with the first user of the first online system with corresponding user profile data associated with the second user of the second online system.

4. The method of claim 1, wherein sharing user information across the first online system and the second online system comprises supplementing user profile data associated with the second user of the second online system with corresponding user profile data associated with the first user of the first online system.

5. The method of claim 1, wherein the second online system is separate from the first online system, and the first online system and second online system do not share identity information of the first user and the second user before the threshold condition is satisfied by the degree of the match.

6. The method of claim 1, wherein the first set of features comprises a first set of facial features of the first user and wherein the second set of features comprises a second set of facial features of the second user.

7. The method of claim 6, wherein applying the trained prediction model comprises applying a trained image analysis model to the first set of facial features and the second set of facial features.

8. The method of claim 1, wherein the aggregate set of text features comprises a first set of text features describing the first user and a second set of text features describing the second user.

9. The method of claim 8, wherein applying the trained prediction model comprises applying a trained text analysis model to the first set of text features and the second set of text features.

10. The method of claim 1, further comprising responsive to the degree of the match satisfying the threshold condition, generating a comprehensive user profile of the first user of the first online system based on user profile data of the first user of the first online system and user profile data of the second user of the second online system; and storing the comprehensive user profile of the first user of the first online system.

11. The method of claim 10, further comprising selecting a content item for display for the first user of the first online system based on the comprehensive user profile of the first user of the first online system; and rendering the content item for the first user of the first online system.

12. A method comprising:
receiving, from a third party system by an online system, a photo of a user of the third party system, wherein the third party system is independently operating from the online system;
applying, by the online system, a trained identity mapping model to predict a degree of a match between the user of the third party system and the user of the online system based on the photo of the user of the third party system and a profile photo of the user of the online system; and
responsive to the degree of the match satisfying a threshold condition, providing for display, by the online system, a content item targeting the user of the online system, the content item selected at least in part based on information associated with the user of the third party system, wherein the third party system and the online system do not share identity information of their users prior to satisfaction of the threshold condition by the degree of the match.

13. The method of claim 12, wherein the photo of the user of the third party system comprises a first set of facial features captured in the photo of the user of the third party system and a first set of text features describing the user of the third party system; and wherein the profile photo of the user of the online system comprises a second set of facial features captured in the profile photo of the user of the online system and a second set of text features describing the user of the online system.

14. The method of claim 13, wherein applying the trained identity mapping model comprises generating a first set of weights based on the first and the second sets of facial features and computing an image score from the first set of weights.

15. The method of claim 14, wherein applying the trained identity mapping model comprises generating a second set of weights based on the first and the second sets of text features and computing a text score from the second set of weights.

16. A non-transitory computer-readable storage medium storing instructions, the instructions when executed by a processor cause the processor to:

receive, by a first online system having a first user associated with a first photo, a second photo associated with a second user of a second online system;
generate, by the first online system, a prediction score indicating a degree of a match between the first user and the second user by applying a trained prediction model to an aggregate set of facial features of the first and the second photos and to an aggregate set of text features describing the first user and the second user; and
responsive to the degree of the match satisfying a threshold condition, share, by the first online system, user information extracted from textual information describing the first user and the second user, across the first online system and the second online system.

17. The non-transitory computer-readable storage medium of claim 16, wherein sharing user information across the first online system and the second online system comprises supplementing user profile data associated with the first user of the first online system with corresponding user profile data associated with the second user of the second online system.

18. The non-transitory computer-readable storage medium of claim 16, wherein the second online system is separate from the first online system, and the first online system and second online system do not share identity information of the first user and the second user before the threshold condition is satisfied by the degree of the match.

19. A non-transitory computer-readable storage medium storing instructions, the instructions when executed by a processor cause the processor to:
receive, from a third party system by an online system, a photo of a user of the third party system, wherein the third party system is independently operating from the online system;
apply, by the online system, a trained identity mapping model to predict a degree of a match between the user of the third party system and the user of the online system based on the photo of the user of the third party system and a profile photo of the user of the online system; and
responsive to the degree of the match satisfying a threshold condition, provide for display, by the online system, a content item targeting the user of the online system, the content item selected at least in part based on information associated with the user of the third party system, wherein the third party system and the online system do not share identity information of their users prior to satisfaction of the threshold condition by the degree of the match.

20. The non-transitory computer-readable storage medium of claim 19, wherein the photo of the user of the third party system comprises a first set of facial features captured in the photo of the user of the third party system and a first set of text features describing the user of the third party system; and wherein the profile photo of the user of the online system comprises a second set of facial features captured in the profile photo of the user of the online system and a second set of text features describing the user of the online system.

* * * * *